Figure 1:
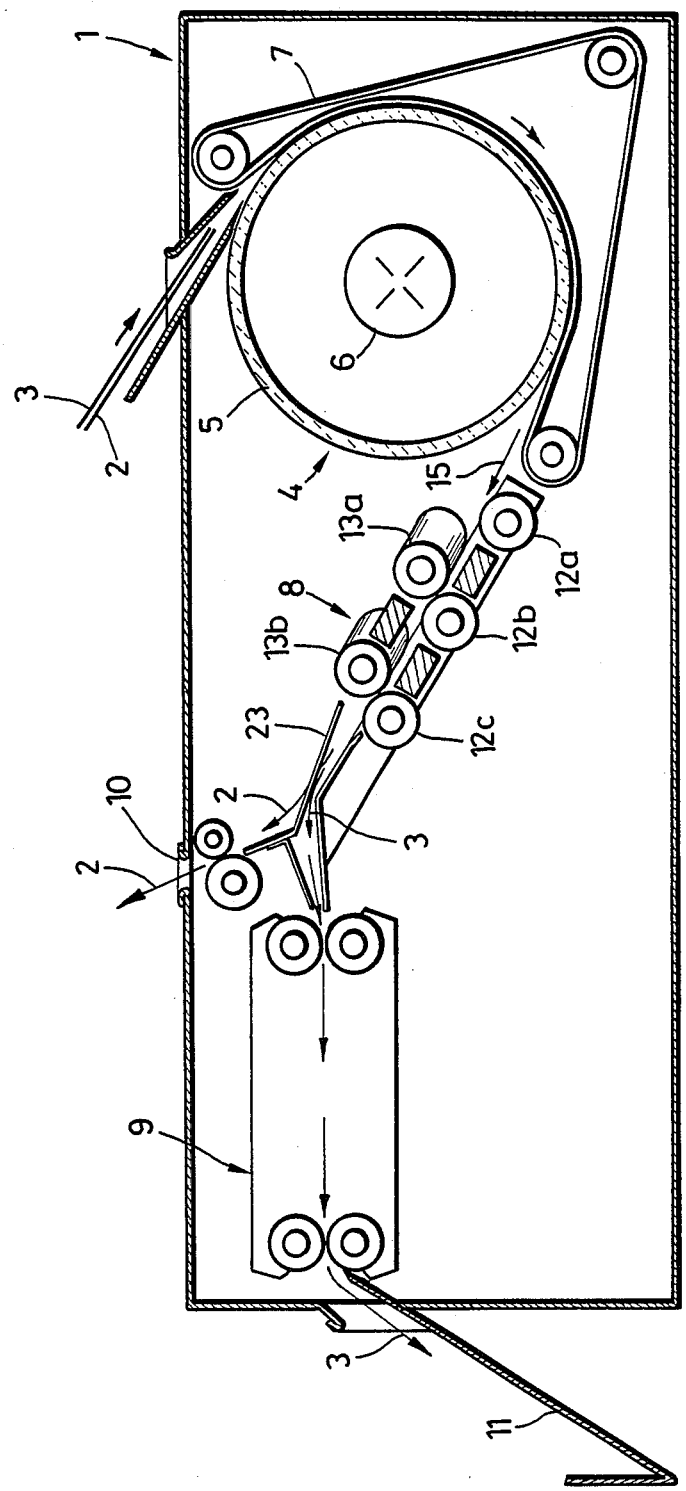

United States Patent [19]

Magka

[11] Patent Number: 4,737,826
[45] Date of Patent: Apr. 12, 1988

[54] DEVICE FOR DUPLICATING MICROFILMS OR MICROFICHES

[75] Inventor: Peter Magka, Bonn, Fed. Rep. of Germany

[73] Assignee: Fotoclark Grün GmbH & Co. KG, Fed. Rep. of Germany

[21] Appl. No.: 824,258

[22] Filed: Jan. 22, 1986

[30] Foreign Application Priority Data

Jan. 22, 1985 [DE] Fed. Rep. of Germany ....... 3501880

[51] Int. Cl.$^4$ ............................................. G03B 27/22
[52] U.S. Cl. ...................................... 355/104; 355/106
[58] Field of Search ........................ 355/104, 106, 117

[56] References Cited

U.S. PATENT DOCUMENTS 3,709,596  1/1973  Ulmer ................................. 355/104

Primary Examiner—Monroe H. Hayes
Attorney, Agent, or Firm—Diller, Ramik & Wight

[57] ABSTRACT

The device for duplicating microfilms or microfiches comprises an exposure section (4), a separating means (8) in which the two components (2,3) of the film material, viz. film original (2) and copying film (3) are mutually separated in the film plane during the further advance by a marginal guide means or keep-off plate (23) so that the copying film (3) immediately gets into the developing section (9) while the film original (2) is discharged laterally. The separating means (8) consists of an inclined roller assembly of two groups of transport rollers (12a, 12b, 12c; 13a, 13b) provided at both sides of the film material (2,3) and of which one group of at least two transport rollers (13a, 13b) is arranged in such a way that their roller axes (16a, 16b) extend obliquely relative to the opposite three lower transport rollers (12a, 12b, 12c). The transport roller groups mounted on both sides of the film material are staggered while their mutual distance is as close as to permit a comb-like meshing of the roller peripheries thus causing the film material (2,3) to wavily pass therethrough.

20 Claims, 4 Drawing Sheets

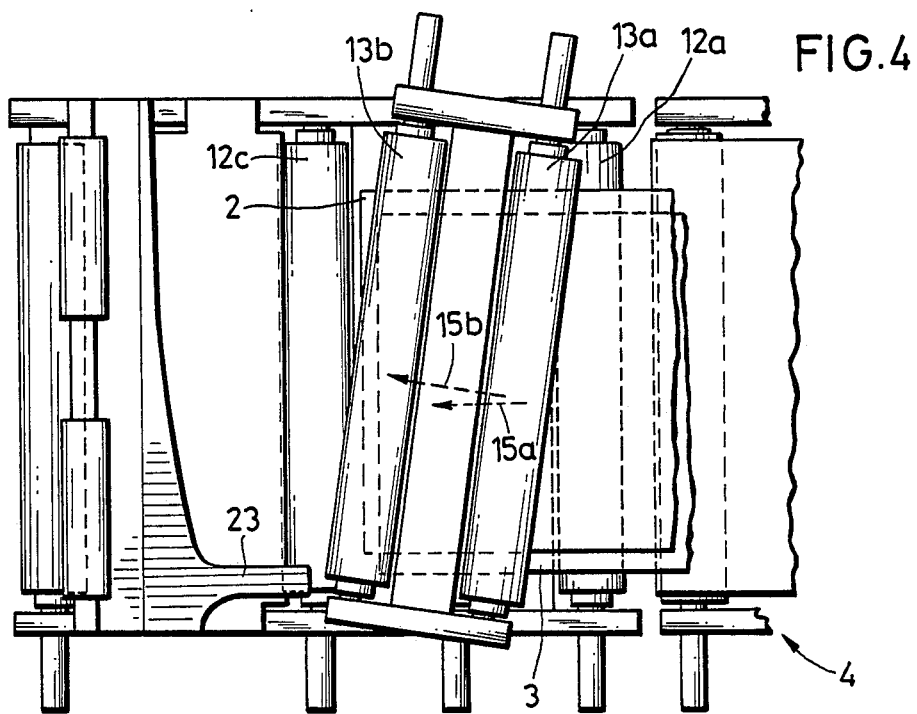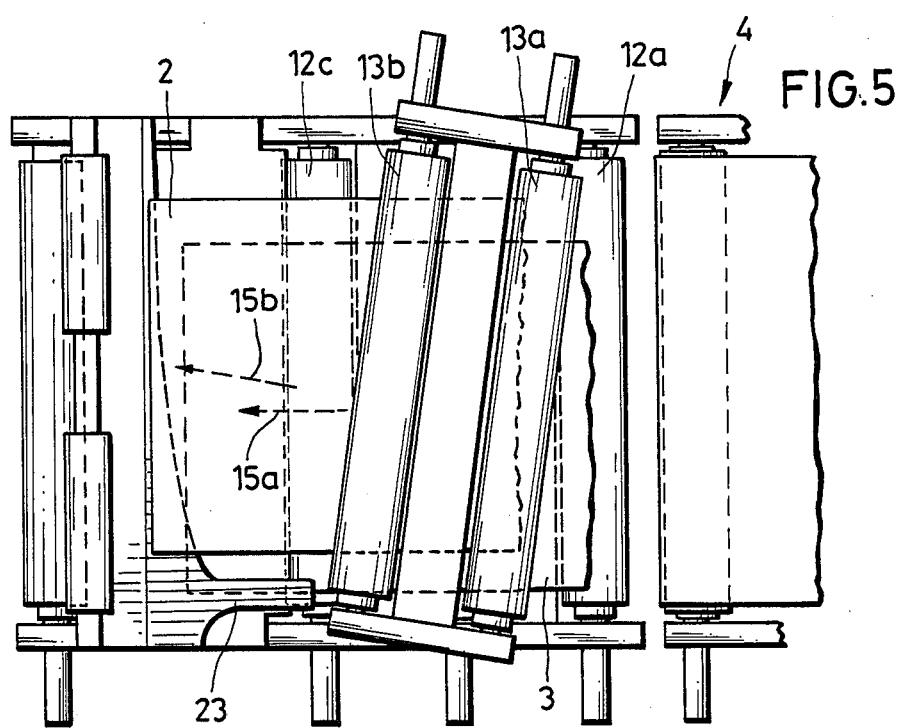

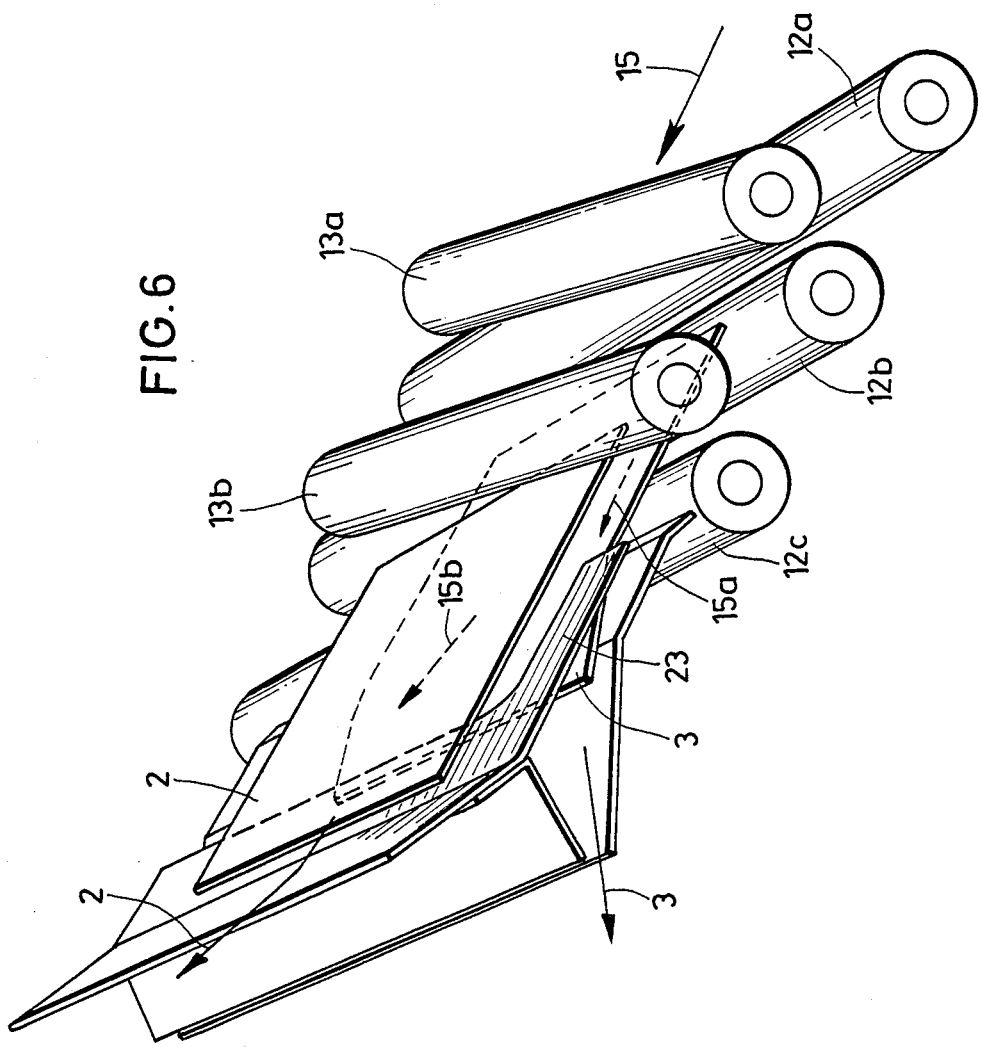

DEVICE FOR DUPLICATING MICROFILMS OR MICROFICHES

The invention relates to a device for duplicating microfilms or microfiches.

For duplicating microfilm originals or microfiches, use has been made not only of very efficient large automatic duplicating machines, but also of smaller table duplicators operated manually and in which the microfilm originals or master films to be duplicated are first exposed in an exposure section to a copying film which subsequently, upon the passage of the exposure section, is ejected together with the microfilm original or master film.

The known table duplicators are adapted to be operated with diazo-films as well as with so-called vesicular films which are subjected to a heat development in the developing part.

A particular problem involved with said table duplicators resides in the fact that the microfilm original or master film, after having passed the exposure section, cannot be separated satisfactorily within the device from the copying film prior to the passage of the latter through the developing part. Therefore, after the common ejection of both film portions, the master film as well as the exposed copying film must be separated manually outside the device. Further, as an additional difficulty, the master film and the exposed copying film are passing the exposure unit in being accurately superposed edge on edge thus not offering a starting point for lifting one film from the other.

While a separation between master film and exposed copying film may be realisable within the device by suction means, such a process did not yet prove its quality.

It is the object of the invention to provide an apparatus for duplicating microfilms or microfiches by which it is possible in a simple manner to separate already within the device or apparatus the master film or microfilm original from the exposed copying film after the passage of the exposure unit so that only the master film or the microfilm original is ejected immediately, while the exposed copying film is passed on to the developing unit.

The problem is solved with a device according to of claim 1, while claims 2 to 11 specify particularly advantageous embodiments of the invention.

According to the invention, after the passage of the the exposure section, one of the two film components of the film material, as a rule, the microfilm original, is so displaced laterally in the film plane relative to the other film component, namely relative to the copying film, during the transport through the separating means, that a guide rail, guide plate, keep-off plate or the like, provided in the further transport path of the film material, underengages marginally one of the two film components to lift and separate it from the other laterally displaced film portion during the passage through the device.

In a preferred embodiment of the invention, the separating means consists of an inclined roller assembly formed of two groups of transport rollers arranged in parallel at both sides of the film material and of which one group of transport rollers is mounted at the outlet of the exposure section and the inlet of the developing section, the roller axes extending rectangularly to the conveying direction for the film material, while the other group consists of at least two transport rollers located on the opposite side of the film material, their roller axes being positioned obliquely relative to the first transport rollers. It is possible to realise a particularly safe passage and a correct separation of both film components if the two groups of transport rollers are mounted to be mutually inclined at an angle of about 5° to 15°, preferably of about 10°.

According to another feature of the invention, the passage of the film material and the mutual displacement of film original and copying film may be still improved in that the groups of transport rollers on both sides of the film material are mutually staggered and so closely spaced that the roller peripheries are meshing like combs thus causing the film material to wavily run therethrough.

The mutual displacement of film original and copying film may be further improved in that the inclined transport rollers confronted with the film original have a higher surface adhesion to the film material than the opposite transport roller. This may be achieved, in a preferred embodiment of the invention, by a lesser surface hardness of the inclined transport rollers. Moreover, the peripheral speed of the transport rollers facing the film original may be higher than that of the opposite transport rollers.

To ensure a treatment as careful as possible of the film original but also of the copying film to be prepared while they pass the inclined roller assembly, it is advisable to provide for the transport rollers of the inclined roller assembly a common, positive drive preferably of a chain drive design. The drive of the inclined transport rollers may be performed by a universal-joint shaft driven by the chain drive according to the Cardan Transmission Principle.

Finally, to separate the film original from the exposed copying film, there is provided at the end or downstream of the inclined roller arrangement a guide tongue, a guide plate, a keep-off plate or the like directing the exposed copying film to the inlet of the developing section while the separated film original is passed laterally by the guide tongue to the ejection slot or to the place of deposit.

Due to the fact that the superposed film components travel intermediate the lower and upper transport rollers positioned in mutually inclined relationship, the performance will be as follows hereunder:

The copying film moving on the transport rollers which are mounted transversely to the sense of travel of the film material and between exposure section and developing section is conveyed rectilinearly in conveying direction while the other film component, viz. the microfilm original situated on top upon the passage of the exposure section, comes into contact with the inclined two upper transport rollers of the roller assembly and is deviated laterally from its original travel sense to be more and more displaced laterally relative to the copying film during the further transport so that the microfilm original or the master film, as it is further conveyed, runs up the guide plate or guide tongue to be routed to the outside via a lateral ejection slot of the device. At the same time, the exposed copying film running straightly in transport direction is conveyed beneath the guide rail or guide plate to the developing unit to subsequently pass therethrough.

A preferred embodiment of the invention is illustrated schematically in the enclosed drawing.

Figure 2:
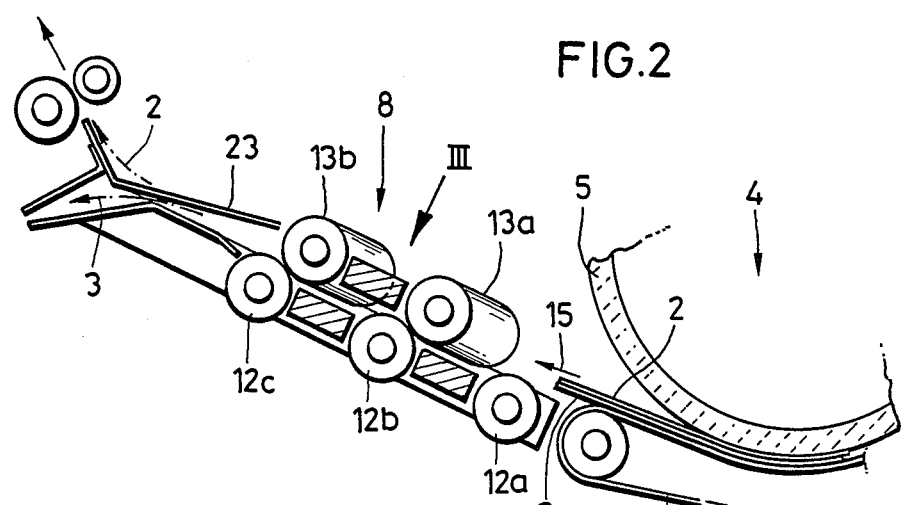
Figure 3:
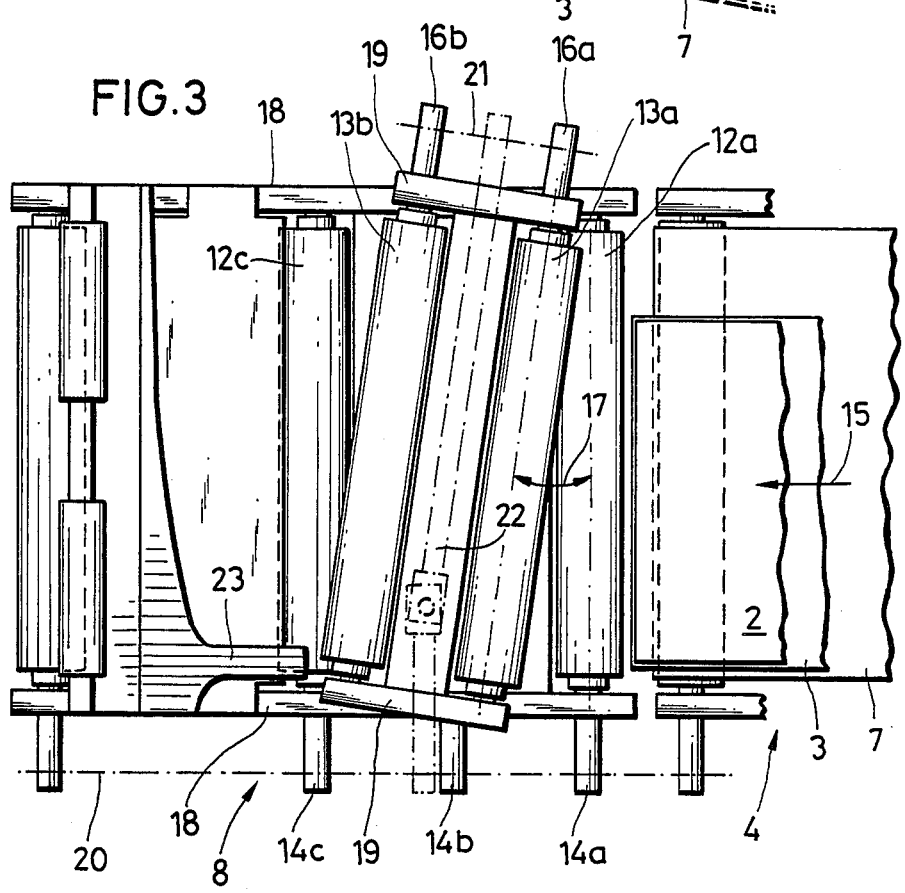

FIG. 1 shows a side sectional view of a table duplicating device comprising the inclined roller assembly of the invention to separate the microfilm original or masterial film from the copying film upon the passage of the exposure section, FIG. 2 shows a detail view scaled up over FIG. 1 concerning the inclined roller assembly of the device or apparatus, FIG. 3 is a plan view of the inclined roller assembly in direction of arrow III of FIG. 2 prior to the feed-in of exposed film material, FIG. 4 is a plan view of the inclined roller assembly in case of the further passage of the film material, FIG. 5 is plan view of the inclined roller assembly in case of an already advanced state of mutual displacement of microfilm-original and copying film and FIG. 6 is a perspective detail view of the inclined roller assembly, the microfilm-original and the coyping film, after having passed the inclined roller assembly, being already so much separated from one another that the microfilm original gets to a lateral ejection slot at the device while the film copy is further conveyed rectilinearly to the developing section.

As may be seen in FIGS. 1 to 6 showing the substantial details of the device 1 for duplicating microfilms or microfiches, the film material consisting of a film original 2 and a copying film 3 passes an exposure section 4 which includes a rotatable exposure drum 5, a lamp 6 and an endless conveyer belt 7, the film original 2 being separated from the copying film 3 by a separating means 8 ahead of a developing section 9. The film original 2 is ejected through a lateral slot 10 at the top of the device while the copying film 3 having passed the developing section 9 gets to a place of deposit 11.

The separating means 8 is formed by an inclined roller assembly in which the two components 2,3 of the film material are laterally displaced mutually in the film plane and, as they go on travelling, they are separated from one another by a marginal guide means or a keep-off means so that the copying film 3 immediately gets into the developing section 9 while the film original 2 is discharged laterally.

As may be fully seen in the drawing, the inclined roller assembly 8 consists of two groups of transport rollers 12a, 12b, 12c or 13a, 13b, mounted in parallel relationship on both sides of the film material 2,3.

One group of the transport rollers 12a, 12b, 13c is arranged between the outlet of the exposure section 4 and the inlet of the developing section 9, their roller axes 14a,14b,14c extending rectangularly to the conveying direction 15 of the film material (FIG. 3), while the other group consists of at least two further transport rollers 13a,13b which are positioned on the opposite side of the film material 2,3, their roller axes 16a,16 extending obliquely to the first mentioned transport rollers 12a,12b,12c. The axes of of the two groups of transport rollers is inclined at an angle 17 of about 5° to 15°, preferably of about 10°.

As may be noted particularly from FIGS. 2 and 3, the groups of transport rollers 12a,12b,12c and 13a, 13b are positioned to be staggered on both surfaces of the film material 2,3, while their mutual distance in travel direction 15 of the film material is as close as to permit a comb-like meshing of their roller peripheries thus causing the film material to wavily pass therethough. The surface adhesion to the film material of the two inclined transport rollers 13a, 13b confronted with the film original 2 is higher than that of the opposite transport rollers 12a,12b,12c. This may be achieved by a lesser surface hardness of said transport rollers. Alternatively, the peripheral speed of the transport rollers 13a,13b confronted with the film original 2 may be also higher than that of the opposite transport rollers 12a,12b,12c. In case of the same number of revolutions of the upper and lower transport rollers, this may be effected e.g. by different roller diameters and, consequently, by different roller circumferences to thus advance more quickly during the passage through the roller assembly 8 the film original 2 as compared to the copying film 3 and, at the same time, to cause a lateral displacement in oblique direction such as shown in the plan view of FIG. 4 by the two arrows 15a,15b concerning the directions of the copying film 3 and the film original 2.

The transport rollers 12a,12b,12c and 13a, 13b are pivoted in frames 18,19. Further, all of the rollers of the inclined roller assembly 8 are positively driven in common by a drive which may be a common chain drive as drafted schematically by broken lines in FIG. 3. Moreover, there is provided for the common drive of the inclined transport rollers 13a, 13b, a universal joint shaft 22 entrained by the chain drive 20 in accordance with the Kardan transmission principle. At the end or downstream of the inclined roller assembly 8, a guide tongue, guide plate or lateral keep-off plate 23 is so mounted that, upon its passage through the inclined roller assembly 8, the exposed copying film 3 is straightly advanced to the inlet of the developing section 9, i.e. in the direction of arrow 15a while the film original 2 separated therefrom passes laterally by the guide tongue 23 to get to the ejection slot 10 or to the deposit at the outside of the device (FIGS. 5, 1 and 2).

In case of a specific type of copying film (vesicular film), a second pass of the copy through the exposure section 4 but not through exposure section 9 is required. The surface hardness of the two upper rollers 13a, 13b being inferior to that of the three lower rollers 12a, 12b, 12c, the resultant adhesion to the film material is higher so that the copy moving alone a second time through the exposure unit 4 is laterally displaced half as much this time by the inclined upper transport rollers 13a, 13b as in case of its travel in common with the master film or film original. However, said slight lateral displacement is sufficient for preventing the copy from running through the developing section 9 and for conveying it into the place of deposit of the master film.

Due to the higher speed of the upper transport rollers 13a, 13b, the master film is conveyed more quickly to the place of deposit, and the copying efficiency of the device is increased accordingly.

What is claimed is:

1. A device for duplicating microfilms, microfiches or the like comprising a developing section downstream of an exposure section, means for moving an original film and a copying film in stacked relationship along a path of travel from said exposure section toward said developing section, means for separating the stacked films during movement thereof towards said developing section, said separating means including conveyor means between which the stacked films are conveyed, said conveyor means including a first conveyor on a first side of said path of travel for conveying a first of the films in a first direction along said path of travel, and said conveyor means further including a second conveyor on a second side of said path of travel opposite said first side for conveying a second of said stacked films in a second direction generally the same as said first direction but diverging relative thereto in the downstream direction thereby effecting separation of the stacked films by relative movement thereof laterally of the path of travel.

2. The device as defined in claim 1 wherein at least one of said first and second conveyors is a roller.

3. The device as defined in claim 1 wherein both of said first and second conveyors is a roller.

4. The device as defined in claim 1 wherein at least one of said first and second conveyors is a roller having an axis generally normal to one of said first and second directions.

5. The device as defined in claim 1 wherein at least one of said first and second conveyors is a roller having an axis defining an acute angle with one of said first and second directions.

6. The device as defined in claim 1 wherein both said first and second conveyors is a roller each having an axis, and the axis of a first of said rollers is generally normal to said first direction and defines an acute angle with said second direction.

7. The device as defined in claim 1 wherein both said first and second conveyors is a roller each having an axis, the axis of a first of said rollers is generally normal to said first direction and defines an acute angle with said second direction, and said first direction and said path of travel are generally coincident.

8. The device as defined in claim 1 wherein both said first and second conveyors is a roller each having an axis, the axis of a first of said rollers is generally normal to said first direction and defines an acute angle with said second direction, and means for engagingly guiding a lateral edge of one of said films after at least partial lateral separation thereof has been effected by said first and second conveyors.

9. The device as defined in claim 1 wherein both said first and second conveyors is a roller each having an axis, the axis of a first of said rollers is generally normal to said first direction and defines an acute angle with said second direction, and means for rotating at least one of said first and second conveyors.

10. The device as defined in claim 1 wherein both said first and second conveyors is a roller each having an axis, the axis of a first of said rollers is generally normal to said first direction and defines an acute angle with said second direction, and means for rotating both said first and second conveyors.

11. The device as defined in claim 1 wherein the diveging relationship established by the first and second directions is generally in the range of about 5° to 15°.

12. The device as defined in claim 1 wherein said first and second conveyors are each defined by a plurality of rollers, and said first and second plurality of rollers are staggered relative to each other in the first and second directions and are intimately adjacent each other so as to define a wavy path portion therebetween.

13. The device as defined in claim 1 wherein said first and second conveyors are rollers each having a peripheral surface, and one of said first and second conveyor peripheral surfaces has a higher surface adhesion to the film immediate thereto than to the film more remote therefrom.

14. The device as defined in claim 1 wherein said first and second conveyors are rollers each having a peripheral surface, and the peripheral surface of the roller most adjacent the original film has a higher surface adhesion thereto than the surface adhesion of the roller most adjacent the copying film.

15. The device as defined in claim 1 wherein said first and second conveyors are rollers each having a peripheral surface, and the peripheral surface of the roller most immediate the original film is softer than that of the peripheral surface of the roller most remote from the original film.

16. The device as defined in claim 1 wherein each of said first and second conveyors is a roller, and means for rotatably driving said first and second rollers.

17. The device as defined in claim 1 wherein each of said first and second conveyors is a roller, means for rotatably driving said first and second rollers, and said rotatable driving means includes a chain drive common to all said rollers.

18. The device as defined in claim 6 wherein the diverging relationship established by the first and second directions is generally in the range of about 5° to 15°.

19. The device as defined in claim 6 wherein said first and second conveyors are each defined by a plurality of rollers, and said first and second plurality of rollers are staggered relative to each other in the first and second directions and are intimately adjacent each other so as to define a wavy path portion therebetween.

20. The device as defined in claim 18 wherein said first and second conveyors are each defined by a plurality of rollers, and said first and second plurality of rollers are staggered relative to each other in the first and second directions and are intimately adjacent each other so as to define a wavy path portion therebetween.

* * * * *